May 23, 1972  J. B. KRAMER  3,664,818
INJECTOR

Filed June 26, 1970  3 Sheets-Sheet 2

INVENTOR
JOHN B. KRAMER
BY

ATTORNEY

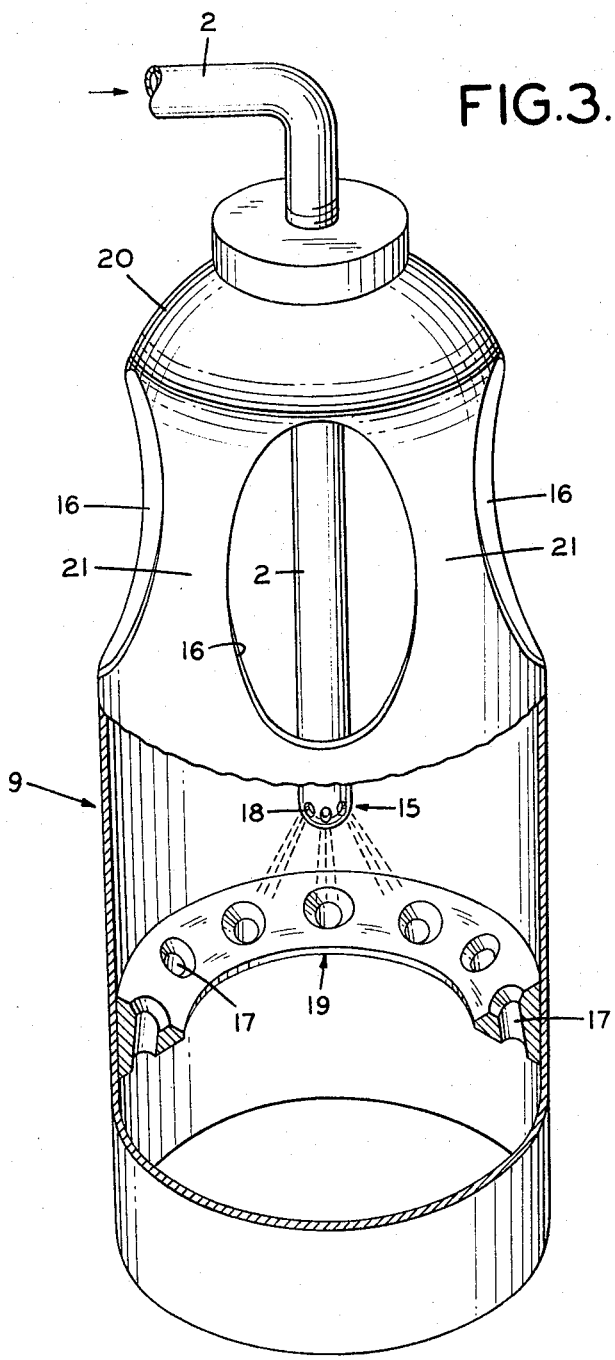

3,664,818
INJECTOR
John B. Kramer, Houston, Tex., assignor to Allied Chemical Corporation, New York, N.Y.
Filed June 26, 1970, Ser. No. 50,267
Int. Cl. F02m 21/04
U.S. Cl. 48—180 R      2 Claims

ABSTRACT OF THE DISCLOSURE

Injector design for maximum air entrainment in the course of inter-mixture thereof with fuel to be conducted to the air intake system.

BACKGROUND OF THE INVENTION

This invention relates to the introduction of liquefied petroleum gas (LPG) or natural gas vapor mixed with air into an internal combustion engine through an injector either in substitution for gasoline or to be used as a booster with gasoline, liquefied petroleum gas or diesel fuel in that engine. More particularly, this invention relates to the use of particularly designed injector for maximum air entrainment with liquefied petroleum gas or natural gas vapor for introduction into the engine air intake system.

The substitution of LPG or natural gas for gasoline or the other fuels previously mentioned in the internal combustion engine leads to certain specific advantages; among them the reduction of emissions from the engine, the better burning of the fuel and the low cost of the LPG or natural gas fuel. Even where gasoline or diesel fuel is used in the internal combustion engine, it is advantageous to supercharge the engine by introducing air and vapor of natural gas or liquefied petroleum gas, for example, propane, into the mixture introduced into the engine air intake system.

It is an object of the invention, therefore, to provide injector apparatus for introducing air and vapor of liquefied petroleum gas or natural gas into the air intake system of the internal combustion engine.

Other objects and advantages of the invention will become more apparent upon reading the following detailed description.

DESCRIPTION OF THE INVENTION

Generally, the invention comprises heating and thus raising the pressure of vaporized natural gas or liquefied petroleum gas, and entraining air with it in an injector, as will be described more fully heerinafter, at a point close to the narrowest point of the venturi, followed by introduction into the engine air intake system. It is understood that although the description will be made with relation to a carburetor arrangement, it is similarly applicable to the air intake system of, for example, a diesel engine.

The invention will now be described in greater detail with relation to the following drawings:

FIG. 3 shows the preferred embodiment of the air injector.

Figure 1:
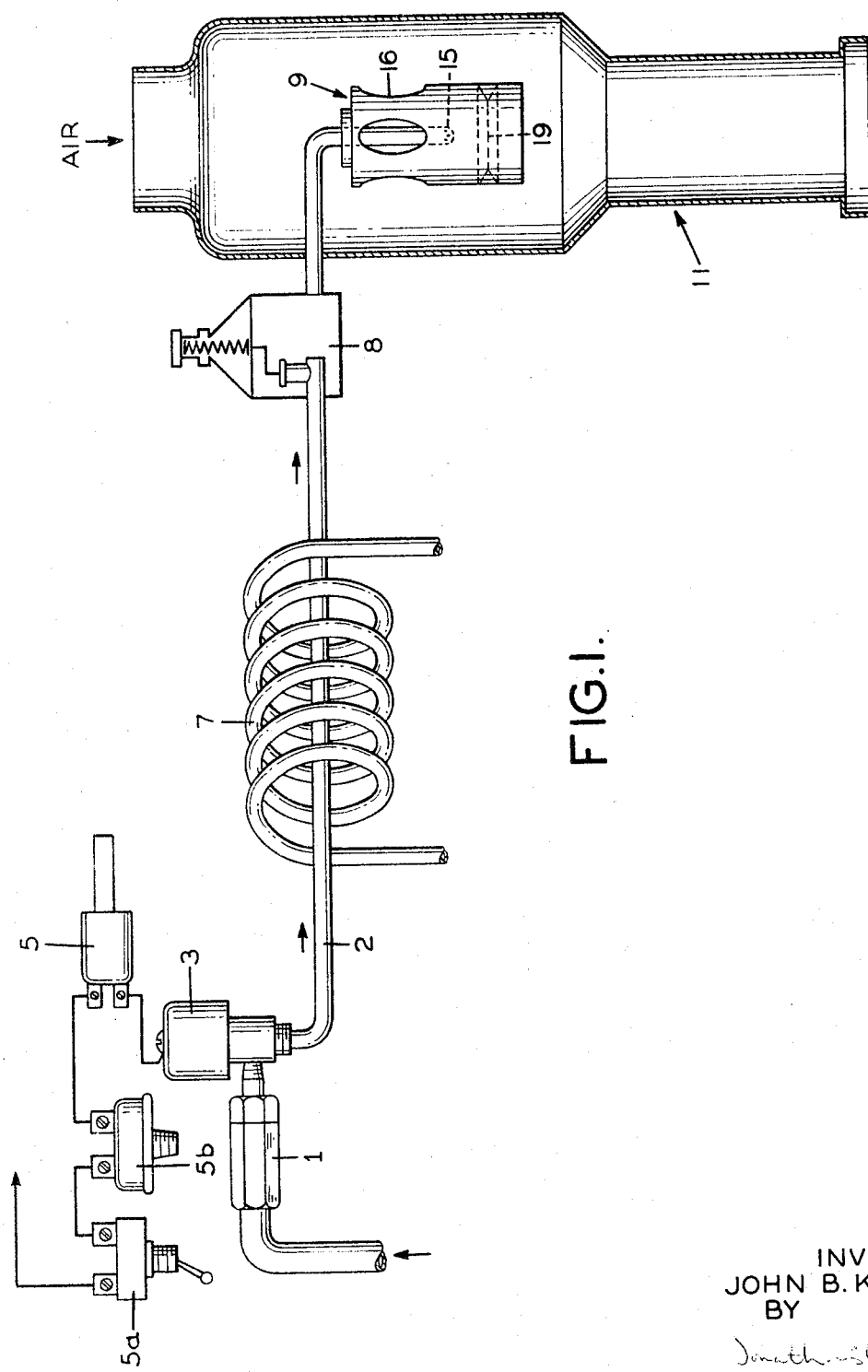
FIG. 1 is a schematic showing a method of introducing LPG.

Referring to FIG. 1 which shows one embodiment of a method of introducing LPG into an engine. Vapor or liquid and vapor from a storage tank or other source (not shown), say for example, propane, after being filtered, as shown diagrammatically at 1 is routed through line 2 toward the air intake system, which in this embodiment consists of carburetor 11. Flow of the LPG vapor or liquid partially vaporized may, for example, be controlled by energization of the throttle and thus switch 5, provided that there is also energization of a double switch, for example the double switch shown schematcially as dash toggle switch 5a, connection to the ignition, and oil pressure switch 5b. Thus with dash toggle switch 5a in the energization position, and oil pressure switch 5b energized as a result of oil pressure reaching a predetermined level, actuation of the throttle and thus switch 5 will allow the flow of vapor through solenoid lockoff device 3, as shown.

Said vapor or liquid and vapor flows through the line 2 and is heated, and thus fully vaporized and raised in pressure, by hot water or other heated substance contained in the coil 7 surrounding said line. The temperature of the medium in the coil 7 is preferably in the range of 175° to 195° F. The heated vapor is then conveyed by line 2 to a pressure regulator 8, which regulates the pressure to that pressure desired, in one embodiment in the range of 250 to 350 pounds per square inch, and in one embodiment, about 300 pounds per square inch. Such a regulator will be required, for example, because the heating of the vapor preceding such regulation in the temperature range indicated will raise the pressure of LPG vapor to a high level, in one embodiment above 350 pounds per square inch. Furthermore the regulator 8 is desirable in the disclosed system so as to insure metering of the vapor to the air stream at a constant, predetermined rate of flow, rather than a varying rate of flow. From the regulator, the vapor is introduced into the air entrainment gas injector 9 located within the air intake system (shown diagrammatically at 11) of an internal combustion engine, and is emitted at the nozzle 15 to impinge on the narrowest point of the venturi (see FIG. 2) to intermix with and/or entrain air entering through the intake ports 16 to then be carried into the air intake system or carburetor 11 through the ports 17 and the venturi 19. Further mixture, that is secondary mixture, of the vapor and the entrained air will take place after the venturi 19 as a result of the creation of the negative pressure produced by the use of the venturi effect. Thus, the vapor is introduced in such a manner as to insure the entrainment both before and after the venturi of large quantities of air.

Figure 2:
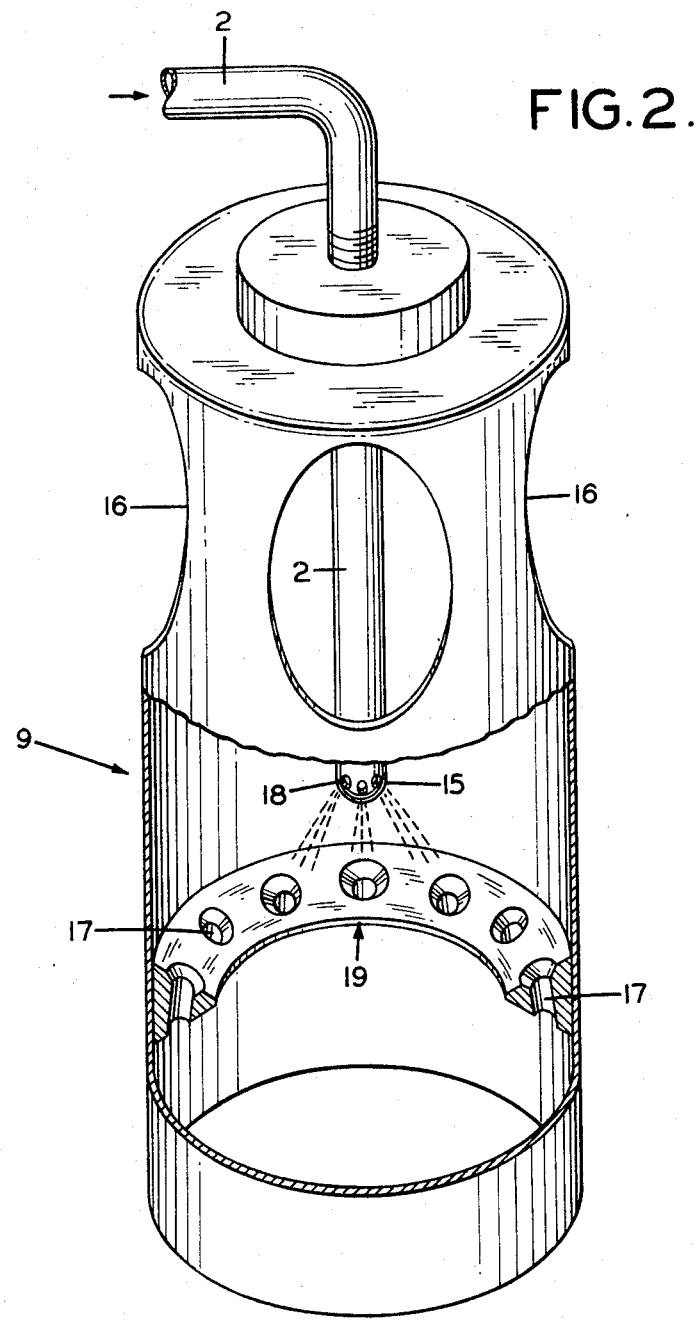
FIG. 2 is a detailed showing of an efficient method of air entrainment.

Referring to FIGS. 1 and 2, it will be noted that the openings 18 in the nozzle 15 are located to be so adjacent the narrowest point (the point of constriction) of the venturi and that the gas exiting from the openings 18 must substantially impinge on the point at the point of constriction of the venturi 19 when exiting from the nozzle, thus providing for the most effective homogeneous mixing and movement of the gas and entrained air into the air intake system or carburetor. In the particular embodiment illustrated, the configuration or the nozzle is shown as convex with four, say, #80 holes provided therein through which the gas exits from the nozzle 15.

The mixing ports 17 leading to the carburetor through which additional air passes are placed at approximately a 20 to 25° outward angle (from the axis of line 2) in the venturi, which, as previously described, allows a secondary entrainment of air by a portion of the air swirling slightly and impinging on the lower edge of the air entrainment gas injector 9. Secondary air will also be drawn alongside of the air entrainment gas injector. Said secondary air will homogeneously mix with the vapor and air as a result of the use of the venturi effect.

In FIG. 3 is shown an embodiment of the air injector 9 which is in most respects like the injector shown in FIG. 2. However, the injector of FIG. 3 is particularly designed for maximum air entrainment, a condition which allows for maximum power boost and reduction or elimination of some of those conditions producing air pollution, to be described in detail hereafter.

In the injector of FIG. 3, the upper outer surface is designed of smooth, curved surfaces with maximum area for the intake ports 16. Specifically, the upper surface 20 of the injector is convex in shape and the entire connecting bands 21 smooth and preferably slightly convex to eliminate the protrusion of turbulence producing edges. Such edges result in friction with the incoming air, the creation of eddy currents and turbulence which reduce the entrainment of incoming air by the injector (it is to be remembered that the pressure imbalance within the injector 9 is creating a condition encouraging the entrainment of air through the ports 16).

In one embodiment utilizing the invention, the use of the injector 9 of FIG. 3 with such maximum air entrainment will result in the reduced use or even elimination of the usual gasoline acceleration pump used with, for example, the standard automobile internal combustion engine. In that embodiment, on demand (for example by mechanical actuation of the system described with relation to FIG. 1 or in connection with the creation of pressure imbalance in the engine manifold) relatively non polluting fuel, such as LPG or compressed natural gas, will be supplied through nozzle 15 and entrained with maximum air as the fuel burning component, in substitution for part or all of the fuel previously supplied through use of the gas accelerator pump. Such use of the injector 9 is dependent, however, on the maximum air entrainment allowed by the design of FIG. 3.

As a result of the employment of the method of entraining air with LPG described in the preceding paragraphs, LPG may be introduced into an internal combustion engine either as a substitute for gasoline or in addition to it or in addition to diesel fuel with the advantages previously discussed. The specific design of entraining discussed with relation of FIG. 3 produces a most efficient method of entraining air with the LPG vapor. Of course, liquefied petroleum gas includes, but is not limited to, propane or butane or other LPG gases or mixtures thereof. Natural gas (compressed or liquefied) might also be used as the source of the vapor.

Although a specific embodiment of both the method of introducing LPG and entrainment of air and apparatus for such introduction and entrainment has been discussed, such specific embodiment has been discussed for illustrative purposes, and the applicant does not mean to limit his invention by details of the method and apparatus set forth. Rather, it is intended that applicant's invention be limited by the following claims.

What is claimed is:

1. Apparatus for entraining and mixing air with vapor of liquefied pertoleum gas or natural gas comprising air entrainment gas injector means having an outer casing to be located within the engine air intake system of an internal combustion engine, said means having a point of constriction in the casing for the creation of a venturi effect, nozzle means located within said casing for injecting vapor into said air entrainment gas injector means, said nozzle means with exit openings therein, said openings located with relation to said point of constriction and at angle in the nozzle means so that vapor exiting therefrom impinges on the point of constriction, a smoothly rounded outer portion of said injector means, the upper portion, with relation to movement of vapor through said injector, of said rounded outer portion convex in shape, substantial intake ports in said casing of said air entrainment air injector means for introducing air into said means, mixing ports within the casing in said air entrainment gas injector means for movement through said last mentioned means of said introduced air for substantial homogeneous mixture at and after the point of constriction with the vapor.

2. Apparatus as recited in claim 1, the axis of said mixing ports at an angle of about 20 to 25° to the axis of said nozzle means.

References Cited
UNITED STATES PATENTS

| | | | |
|---|---|---|---|
| 2,377,088 | 5/1945 | Linn | 48—180 |
| 2,589,946 | 3/1952 | Linn | 48—180 |
| 2,031,709 | 2/1936 | Hunt | 48—180 M UX |
| 2,191,218 | 2/1940 | Linn | 48—180 |
| 2,399,826 | 5/1946 | Ridgway | 48—180 |

JOSEPH SCOVRONEK, Primary Examiner

U.S. Cl. X.R.

48—180 C, 180 H; 261—76, 116, DIG 39, DIG 54